(No Model.)
C. O. PALMER.
TRUCK FOR MINING MACHINES.
No. 594,900. Patented Dec. 7, 1897.
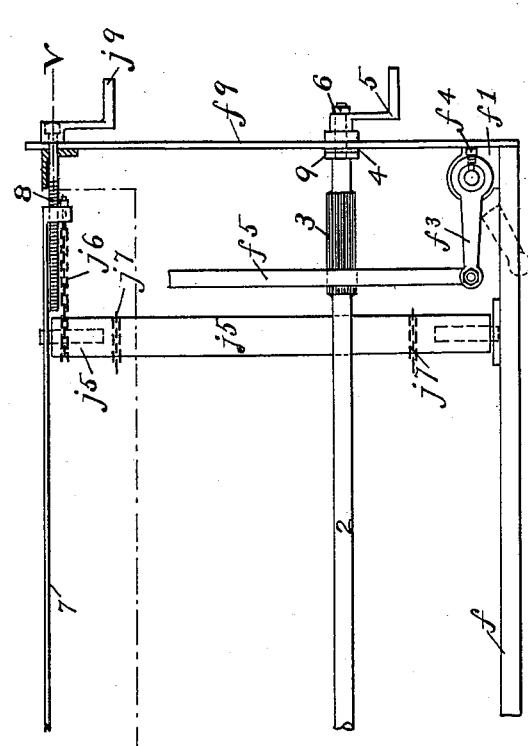
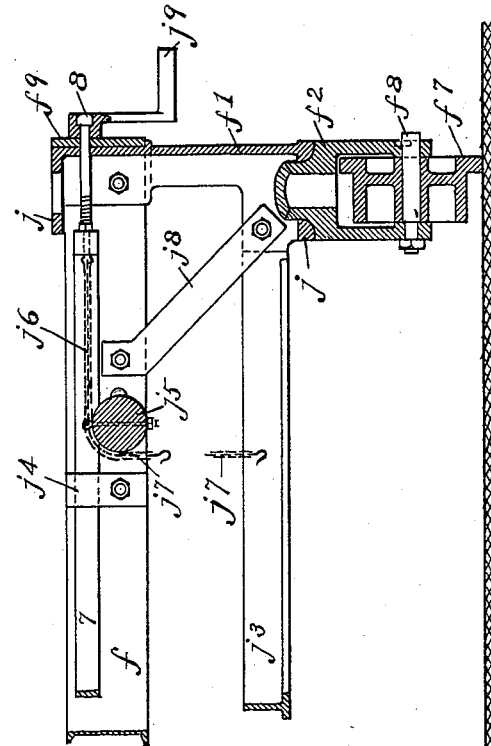
Fig. 1.
Fig. 2.
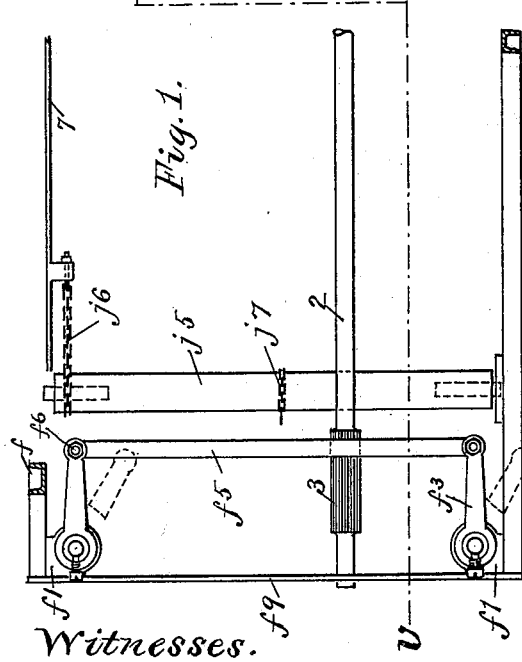
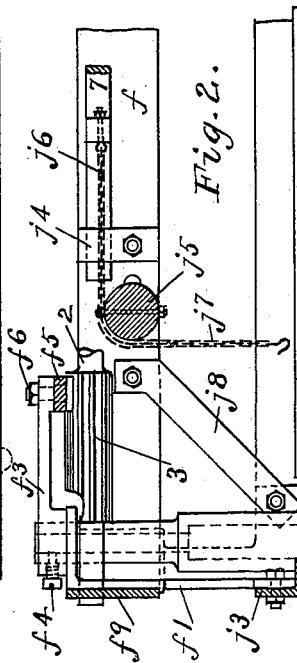
Witnesses.
M. O. Palmer.
Horace Kingsley
Inventor.
C. O. Palmer.

UNITED STATES PATENT OFFICE.

CHARLES OTIS PALMER, OF CLEVELAND, OHIO.

TRUCK FOR MINING-MACHINES.

SPECIFICATION forming part of Letters Patent No. 594,900, dated December 7, 1897.

Application filed March 26, 1897. Serial No. 629,457. (No model.)

*To all whom it may concern:*

Be it known that I, CHARLES OTIS PALMER, a citizen of the United States, residing at Cleveland, in the county of Cuyahoga and State of Ohio, have invented a new and useful Truck for Mining-Machines, of which the following is a specification.

My truck is adapted to the moving of mining-machines, and especially of the class employing cutting apparatus that do their work on the floor of the mine.

It has for its object to simplify the mining-machine by relieving it of the mechanism required for transportation, to save the chisels used by the mining-machine from injury by being dragged over the edge of the truck when being loaded, to do away with the manual labor required in sliding the machine along the floor to get it in position for cutting or loading, to provide improved means for steering the truck in the required direction on a plain surface and for cramping the wheels to lessen the track-friction when rounding curves, and to prevent it jumping the track; also, to provide improved means for lifting and suspending the mining-machine under the truck when being transported. These objects I accomplish by means which will be hereinafter described, and pointed out in the claims.

In the accompanying drawings, Figure 1 is a plan of the truck embodying my present improvements and having certain parts broken away. Fig. 2 is a section on line U V of Fig. 1 with parts broken away.

The truck consists, in a general way, of a somewhat elevated rectangular frame with a caster on each corner. The frame is made of two side bars $f$ and two end bars $f^9$, which are bolted at the corners to the caster-frames $f'$ at a height sufficient to allow the mining-machine to pass under the sides $f$. Each caster consists of an angle-shaped caster-frame $f'$, having a horizontal flange $j$ upon both the upper and lower ends thereof. Situated on one side and two ends of the truck and secured to the lower ends of the caster-frames are the bottom braces $j^3$. Extending from the lower end of the caster-frame $f'$ to the side bars $f$ are the diagonal braces $j^8$, as shown in Fig. 2. Passing through the caster-flanges $j$ are vertical holes in which is swiveled the caster-shank $f^2$. Each shank $f^2$ is forked at the lower end to receive the caster-wheel $f^7$, which is journaled on the axle $f^8$, passing through its lower extremity. Secured to the upper end of shank $f^2$ by the screw $f^4$ is the tiller $f^3$. Passing transversely across the truck at each end and pivoted to the extremity of the tillers $f^3$ by the pintle $f^6$ are the rack-bars $f^5$, having cogs formed on their under side. Passing longitudinally across the truck and journaled in the end bars $f^9$ on each end of the frame is the tiller-shaft 2, having thereon the tiller-pinions 3, whose teeth engage the cogs on the tiller-racks $f^5$. A shoulder is formed on shaft 2 inside the bearing, and splined on said shaft 2, between the shoulder and the end bar $f^9$, is the friction-disk 9. Between the friction-disk 9 and the end bar $f^9$ is a leather washer 4, and splined on the end of shaft 2 is the tiller-crank 5. The pressure against the leather washer 4 is regulated by the nut 6 on the end of the tiller-shaft 2, that tightens leather washer 4 between the friction-disk 9 and the bar $f^9$. Passing transversely across and journaled on the sides of the frame are two winding-drums $j^5$, having lifting-chains $j^7$ attached thereto by an eyebolt or other well-known means. Sliding longitudinally in cleats $j^4$ on the inside of the frame-bar $f$ is the lifting-bar 7. Attached at one extremity to the lifting-bar 7 and at the other to the winding-drum $j^5$ by eyebolts are the winding-chains $j^6$. Passing through the end of the frame and engaging a tapped hole in the end of the lifting-bar 7 is a lifting-screw 8, that is secured to the lifting-crank $j^9$ on its outer end.

To load the machine, the truck is first wheeled directly over the mining-machine, the machine entering within the frame from the side in which the bottom brace $j^3$ was omitted. The lifting-chains $j^7$ are unwound from the winding-drums by turning crank $j^9$, and their lower ends are hooked onto the mining-machine. The movement of the lifting-crank $j^9$ is now reversed, and by acting through the lifting-screw 8, sliding bar 7, and unwinding chains $j^6$ the drums $j^5$ are turned, thus winding up the lifting-chains $j^7$ from the lower to the upper position, (shown in Fig. 2,) thereby simultaneously raising both ends and sides of the machine. This mode of raising renders the cutter-chisels less liable to injury than if the machine was tilted sidewise and the cutters allowed to strike the floor, as would be the case if one corner or end was lifted at a time.

To run the truck in a circle to the right, as when rounding a right-hand curve, the tiller-crank 5 is turned, and by acting through the tiller-shaft 2, tiller-pinions 3, and rack-bars $f^5$ the tillers themselves are made to stand in the position shown in dotted lines in Fig. 1 and the caster-wheels assume the direction of the curve of the track. For a left-hand curve the tiller-crank handle 5 is turned in the opposite direction. The friction-disk 9 allows the crank-handle 5 to remain in any position in which it may be left. By this device the caster-wheels are all turned by one crank-handle only, and the movement of the casters being simultaneous and equal they do not oppose each other, but all act together to steer the carriage in the same direction.

Having thus described my invention, what I claim as new, and desire to secure by Letters Patent, is—

1. The combination in a mining-machine truck, of a frame adapted to support the mining-machine, means for suspending the machine therefrom, casters journaled at the corners of said frame and having tillers rigid with the caster-shanks, a rack-bar hinged to the tillers of two casters, and means for longitudinally moving said connecting-bar to swivel the two casters simultaneously, substantially as described.

2. The combination in a mining-machine truck of a frame adapted to support the mining-machine, means for suspending the machine therefrom, casters journaled at the corners of said frame and having tillers rigid with the caster-shank, a rack-bar connecting the tillers of two casters and a crank-actuated pinion engaging said rack-bar for swiveling the two casters simultaneously, substantially as described.

3. The combination in a mining-machine truck of a frame adapted to support the mining-machine, means for suspending the machine therefrom, casters journaled at the corners of said frame and having tillers rigid with the caster-shank, a rack-bar connecting the tillers of two casters and a crank-actuated pinion engaging said rack-bar for swiveling the two casters simultaneously, and a friction-disk on the pinion-shaft for retaining it in position, substantially as described.

4. The combination in a mining-machine truck, of a frame adapted to support the mining-machine, means for suspending the machine therefrom, casters journaled at the corners of said frame and having tillers rigid with the caster-shank, a rack-bar connecting the tillers of the two casters at each end of the frame, a shaft extending across the frame, and having a pinion engaging each rack-bar, and a crank or equivalent means for rotating said shaft to swivel the casters simultaneously, substantially as described.

5. The combination of the frame having casters and adapted to support the machine, a roller or drum journaled in said frame near each end, lifting-chains fastened to said drums, and winding-chains wound on said drums and secured to a screw-actuated bar for turning said drums to lift the machine, substantially as described.

6. The combination of the frame having casters and adapted to support the machine, a roller or drum in said frame near each end, lifting-chains fastened to said drums, winding-chains wound on said drums and secured to a bar sliding in guides on said frame, and a screw journaled in the frame and engaging a thread on said bar, for simultaneously turning both drums to lift the machine, substantially as described.

7. The combination of the frame having casters journaled at each corner, drums journaled in said frame, lifting-chains fastened to said drums, winding-chains wound on said drums and secured to a screw-actuated bar, tillers rigid with the caster-shanks, a rack-bar at each end of the frame connecting the caster-tillers, a shaft extending lengthwise the frame and having pinions engaging the rack-bars, and means for rotating said shaft to simultaneously swivel the casters, substantially as described.

8. The combination of the frame having casters journaled at each corner, drums journaled in said frame, lifting-chains fastened to said drums, winding-chains wound on said drums and secured to a screw-actuated bar, tillers rigid with the caster-shanks, a rack-bar at each end of the frame connecting the caster-tillers, a shaft extending lengthwise the frame and having pinions engaging the rack-bars, a frictional engagement of the shaft with the frame, substantially as described.

9. The combination of the frame having casters journaled at each corner, drums journaled in said frame, lifting-chains fastened to said drums, winding-chains wound on said drums and secured to a screw-actuated bar, tillers rigid with the caster-shanks, a rack-bar at each end of the frame connecting the caster-tillers, a shaft extending lengthwise the frame and having pinions engaging the rack-bars, a frictional engagement of the shaft with the frame, and a crank on said shaft for simultaneously swiveling the casters, substantially as described.

CHARLES OTIS PALMER.

Witnesses:
J. D. PUGH, Jr.,
A. M. GRAVES.